United States Patent
Lee et al.

(10) Patent No.: US 11,411,656 B2
(45) Date of Patent: Aug. 9, 2022

(54) IMPEDANCE CORRECTING METHOD AND APPARATUS, AND IMPEDANCE-CORRECTED SIGNAL LINE FOR OPTICAL TRANSCEIVER

(71) Applicant: Electronics and Telecommunications Research Institute, Daejeon (KR)

(72) Inventors: Jyung Chan Lee, Daejeon (KR); Eun-Gu Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 17/087,015

(22) Filed: Nov. 2, 2020

(65) Prior Publication Data

US 2021/0135767 A1      May 6, 2021

(30) Foreign Application Priority Data

Nov. 5, 2019   (KR) .................. 10-2019-0140170
Mar. 11, 2020   (KR) .................. 10-2020-0030090

(51) Int. Cl.
*H04B 10/00*   (2013.01)
*H04B 10/69*   (2013.01)
*H04B 10/40*   (2013.01)

(52) U.S. Cl.
CPC ........... *H04B 10/697* (2013.01); *H04B 10/40* (2013.01)

(58) Field of Classification Search
CPC ...... H04B 10/697; H04B 10/40; H04B 10/43; H04B 10/0795; H04B 10/07953; H04B 10/07955; H04B 10/60; H04B 10/6973; H05K 1/025; H05K 1/0253; H01L 2924/3011; H01L 2924/30111

USPC ............... 398/135–139, 158, 159, 25
See application file for complete search history.

(56) References Cited

U.S. PATENT DOCUMENTS

| | | | |
|---|---|---|---|
| 2010/0253450 A1 | 10/2010 | Kim et al. | |
| 2011/0058819 A1* | 3/2011 | Azegami | H04B 10/66 398/135 |
| 2018/0039033 A1 | 2/2018 | Park et al. | |
| 2018/0294883 A1* | 10/2018 | Kim | H04B 10/503 |

FOREIGN PATENT DOCUMENTS

| | | |
|---|---|---|
| KR | 10-2018-0114433 | 10/2018 |
| KR | 10-2024809 | 9/2019 |

OTHER PUBLICATIONS

Sae-Kyoung Kang et al., "A Cost-effective and Compact 28-GB/s ROSA Module using a Novel TO-CAN Package", IEEE, 2012, pp. 1992-1996.

* cited by examiner

*Primary Examiner* — Hibret A Woldekidan
(74) *Attorney, Agent, or Firm* — Kile Park Reed & Houtteman PLLC

(57) ABSTRACT

Disclosed are an impedance correcting method and apparatus, and an impedance-corrected signal line for an optical transceiver. The impedance correction method includes receiving an impedance according to an error of a resin applying process of a signal line for an optical transceiver, acquiring a correction parameter for generating a correction impedance based on the impedance according to the error, and determining the correction impedance for correcting the impedance according to the error based on the correction parameter.

17 Claims, 17 Drawing Sheets

Impedance of case
in which process error is
minimum

Impedance of case
in which process error is
maximum

IMPEDANCE CORRECTING METHOD AND APPARATUS, AND IMPEDANCE-CORRECTED SIGNAL LINE FOR OPTICAL TRANSCEIVER

CROSS-REFERENCE TO RELATED APPLICATION(S)

This application claims the benefit of Korean Patent Application No. 10-2019-0140170, filed on Nov. 5, 2019, and Korean Patent Application No. 10-2020-0030090 filed on Mar. 11, 2020, in the Korean Intellectual Property Office, the entire disclosures of which are incorporated herein by reference for all purposes.

BACKGROUND

1. Field of the Invention

Example embodiments relate to an impedance correcting method and apparatus, and an impedance-corrected signal line for an optical transceiver.

2. Description of the Related Art

Practical uses of personal mobile phones that provide a long term evolution (LTE) service and a 5G service is spreading. Also, a high-speed delivery network and an optical subscriber network for various realistic multimedia services are expanding.

Accordingly, an importance of a large-capacity data storage and a backup device is emphasized, and optical communication technology therefor has faced new issues such as high-speed, lightweight, and integration.

In recent optical communications systems, a high-speed signal line included in an optical transceiver requires a bandwidth of tens of gigahertz (GHz) or more. Also, the optical transceiver is evolving into a smallest, high-density, and multi-channel configuration.

Therefore, implementation of an optical transceiver having a higher density is required.

SUMMARY

An aspect provides technology for correcting an impedance and an impedance-corrected signal line for an optical transceiver.

Technical goals to be achieved by the present disclosure are not limited to the above-described technical tasks, and other technical tasks may exist.

According to an aspect, there is provided an impedance correcting method including receiving an impedance according to an error of a resin applying process of a signal line for an optical transceiver, acquiring a correction parameter for generating a correction impedance based on the impedance according to the error, and determining the correction impedance for correcting the impedance according to the error based on the correction parameter.

The acquiring of the correction parameter may include acquiring a start point of the error based on the impedance according to the error, acquiring a peak point of the error based on the impedance according to the error, and acquiring an impedance value corresponding to the start point based on the impedance according to the error.

The determining of the correction impedance may include determining the correction impedance based on a start point of the error, a peak point of the error, an impedance value corresponding to the start point, and a target impedance value of the signal line.

The determining of the correction impedance based on the start point of the error, the peak point of the error, the impedance value corresponding to the start point, and the target impedance value of the signal line may include determining the correction impedance such that the impedance linearly decreases from the start point.

The determining of the correction impedance such that the impedance linearly decreases from the start point may include determining a peak value of the correction impedance based on a difference between the target impedance value and the impedance value corresponding to the start point.

The determining of the correction impedance such that the impedance linearly decreases from the start point may include determining the correction impedance to have the target impedance value at the peak point.

The determining of the correction impedance such that the impedance linearly decreases from the start point may include determining the correction impedance to have an impedance value greater than the target impedance value at the peak point.

The determining of the correction impedance based on the start point of the error, the peak point of the error, the impedance value corresponding to the start point, and the target impedance value of the signal line may include determining the correction impedance to have a first impedance value from the start point to the peak point, linearly decrease from the peak point, and reach the target impedance value.

The determining of the correction impedance based on the start point of the error of the resin applying process, the peak point of the error of the resin applying process, the impedance value corresponding to the start point, and the target impedance value of the signal line may include determining the correction impedance to have a first impedance value from the start point to the peak point and have a second impedance value by a predetermined length from the peak point.

According to another aspect, there is also provided an impedance correcting apparatus including a receiver configured to receive an impedance corresponding to an error of a resin applying process of a signal line for an optical transceiver, and a processor configured to acquire a correction parameter for generating a correction impedance based on the impedance according to the error and determine the correction impedance for correcting the impedance according to the error based on the correction parameter.

The processor may be configured to acquire a start point of the error based on the impedance according to the error, acquire a peak point of the error based on the impedance according to the error, and acquire an impedance value corresponding to the start point based on the impedance according to the error.

The processor may be configured to determine the correction impedance based on a start point of the error, a peak point of the error, an impedance value corresponding to the start point, and a target impedance value of the signal line.

The processor may be configured to determine the correction impedance such that the impedance linearly decreases from the start point.

The processor may be configured to determine a peak value of the correction impedance based on a difference between the target impedance value and the impedance value corresponding to the start point.

The processor may be configured to determine the correction impedance to have the target impedance value at the peak point.

The processor may be configured to determine the correction impedance to have an impedance value greater than the target impedance value at the peak point.

The processor may be configured to determine the correction impedance to have a first impedance value from the start point to the peak point, linearly decrease from the peak point, and reach the target impedance value.

The processor may be configured to determine the correction impedance to have a first impedance value from the start point to the peak point and have a second impedance value by a predetermined length from the peak point.

The second impedance value may be determined based on the first impedance value.

According to still another aspect, there is also provided a signal line for an optical transceiver, the signal line in which an impedance according to an error of a resin applying process is corrected, wherein a correction of the impedance according to the error is performed by acquiring a correction parameter to generate a correction impedance based on the impedance according to the error and determining a correction impedance for correcting the impedance according to the error based on the correction parameter.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
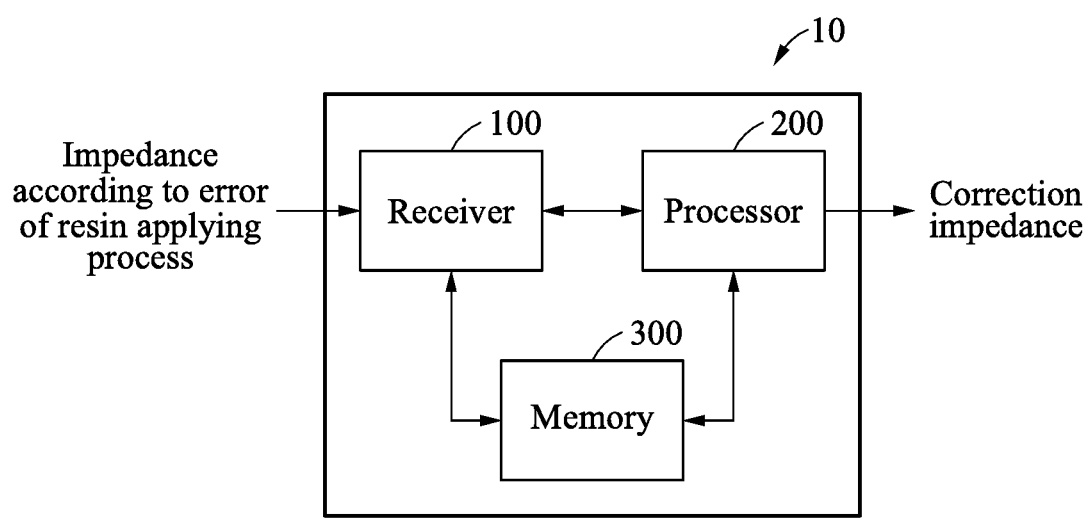
FIG. 1 is a block diagram illustrating an impedance correcting apparatus according to an example embodiment.

Hereinafter, example embodiments will be described in detail with reference to the accompanying drawings. It should be understood, however, that there is no intent to limit this disclosure to the particular example embodiments disclosed. On the contrary, example embodiments are to cover all modifications, equivalents, and alternatives falling within the scope of the example embodiments.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

A component having a common function with a component included in one example embodiment is described using a like name in another example embodiment. Unless otherwise described, a description made in one example embodiment may be applicable to another example embodiment and a detailed description within a duplicate range is omitted.

FIG. 1 is a block diagram illustrating an impedance correcting apparatus according to an example embodiment.

Referring to FIG. 1, an impedance correcting apparatus 10 may correct an impedance of a signal line. The signal line may include a high-speed signal line used in an optical transceiver.

The impedance correcting apparatus 10 may correct impedance mismatching of the signal line caused by a process error occurring in a manufacturing process. For example, the impedance correcting apparatus 10 may correct impedance mismatching due to a leakage of resin in a cavity region of the signal line. The leakage of resin in the cavity region will be further described in detail with reference to FIGS. 4A through 4C.

The impedance correcting apparatus 10 may acquire a correction parameter from an impedance according to an error in a resin applying process of the signal line for the optical transceiver, determine a correction impedance based on the correction parameter, thereby correcting the impedance of the signal line.

The signal line for the optical transceiver may be formed to have the correction impedance determined by the impedance correcting apparatus 10. In other words, by using the impedance correcting apparatus 10, the signal line for the optical transceiver in which the impedance according to the error in the resin applying process is corrected may be formed.

The impedance correcting apparatus 10 may correct the impedance mismatching occurring due to the resin leakage caused by the error in the resin applying process, thereby providing the signal line having an optimum quality required for minimization, high density, and multi-channelization of the optical transceiver.

The impedance correcting apparatus 10 may correct both narrow and wide cavity regions, support the minimization, high density, and multi-channelization of the optical transceiver for optical communication by maximizing a degree of freedom in designing in the cavity region, and provide a signal line with an optimized density even when a density of the optical transceiver increases.

The impedance correcting apparatus 10 may provide an impedance-corrected signal line applicable to various industries requiring a high speed and a high density (for example, mobile communication, high-speed parallel processing supercomputer, high-speed memory, and the like).

The impedance correcting apparatus 10 may include a receiver 100 and a processor 200. The impedance correcting apparatus 10 may further include a memory 300.

The receiver 100 may receive the impedance according to the error in the resin applying process of the signal line for the optical transceiver. The receiver 100 may include a receiving interface. The receiver 100 may output the received impedance to the processor 200.

The processor 200 may determine the correction impedance by processing the impedance received from the receiver 100 and/or an impedance received from the memory 300.

In addition, the processor 200 may process data stored in the memory 300. The processor 200 may execute computer-readable codes (e.g., software) stored in the memory 300 and instructions induced by the processor 200.

The "processor 200" may be a hardware-implemented data processing device having a circuit with a physical structure to perform desired operations. For example, the desired operations may include codes or instructions included in a program.

The hardware-implemented data processing device may include a microprocessor, a central processing unit (CPU), a processor core, a multi-core processor, a multiprocessor, an application-specific integrated circuit (ASIC), and a field programmable gate array (FPGA).

The processor 200 may acquire the correction parameter for generating the correction impedance based on the impedance according to the error in the resin applying process. Hereinafter, an "error" may refer to the error in the resin applying process.

The processor 200 may acquire a start point of the error based on the impedance according to the error in the resin applying process. The processor 200 may acquire a peak point of the error based on the impedance according to the error. The processor 200 may acquire an impedance value corresponding to the start point based on the impedance according to the error.

The start point and the peak point may be a point at which a leakage of resin starts when resin leaks in the cavity region and an end point of the leakage of resin when the leakage is maximum. The start point and the peak point will be further described in detail with reference to FIGS. 4A and 4B.

The processor 200 may determine the correction impedance for correcting the impedance according to the error based on the acquired correction parameter. The correction impedance may be an impedance characteristic corresponding to a position of a signal line to be manufactured through a correction design.

The correction impedance may be an impedance for correcting the impedance according to the error in the resin applying process, and may be an impedance to be acquired for the signal line to have an impedance value close to a target impedance overall. When the signal line is designed in accordance with the correction impedance, the impedance mismatching of the signal line may be minimized even if the resin leakage occurs in the resin applying process.

The processor 200 may determine the correction impedance based on an error start point (hereinafter, also referred to as a "start point"), an error peak point (hereinafter, also referred to as a "peak point"), an impedance value corresponding to the start point, and a target impedance of the signal line. The processor 200 may determine the correction impedance using various methods. Various methods used by the processor 200 to determine the correction impedance will be described in detail with reference to FIGS. 6A through 9B.

The target impedance value may refer to a value of an impedance of a signal line to be achieved through a correction. For example, a target impedance value may refer to a value of an impedance of a signal line in a case in which a resin leakage is absent.

The processor 200 may determine the correction impedance such that the impedance is linearly reduced from the start point. The processor 200 may determine a peak value of the correction impedance based on a difference between the target impedance value and an impedance value corresponding to the start point.

The correction impedance may have a form of a straight line that linearly decreases from the peak value. The peak value of the correction impedance will be described in detail with reference to FIGS. 6A through 7B.

In an example embodiment, the processor 200 may determine the correction impedance to have the target impedance value at the peak point. In another example embodiment, the processor 200 may determine the correction impedance to have a value greater than the target impedance value at the peak point.

In still another example, the processor 200 may determine the correction impedance to have a first impedance value from the start point to the peak point and linearly decrease from the peak point to reach the target impedance value.

In yet another example embodiment, the processor 200 may determine the correction impedance to have the first impedance value from the start point to the peak point and have a second impedance value by a predetermined length from the peak point.

The second impedance value may be determined based on the first impedance value. The determination of the first impedance value and the second impedance value will be described in detail with reference to FIGS. 8A through 9B.

The signal line for the optical transceiver may be corrected based on the above-described impedance correction scheme. That is, the correction of the impedance according to the error in the resin applying process may be performed by acquiring the correction parameter to generate the correction impedance based on the impedance and determining the correction impedance for correcting the impedance according to the error based on the correction parameter.

The processor 200 may store the determined correction impedance in the memory 300.

The memory 300 may store instructions (or programs) to be executed by the processor 200. For example, the instructions may include instructions for executing an operation of the processor 200 and/or an operation of each component of the processor 200.

The memory 300 may be implemented as a volatile memory device or a nonvolatile memory device.

The volatile memory device may be implemented as dynamic random access memory (DRAM), static random access memory (SRAM), thyristor RAM (T-RAM), zero capacitor RAM (Z-RAM), or twin transistor RAM (TTRAM).

The nonvolatile memory device may be implemented as electrically erasable programmable read-only memory (EEPROM), flash memory, magnetic RAM (MRAM), spin-transfer torque (STT)-MRAM, conductive bridging RAM (CBRAM), ferroelectric RAM (FeRAM), phase change RAM (PRAM), resistive RAM (RRAM), nanotube RRAM, polymer RAM (PoRAM), nano floating gate memory (NFGM), holographic memory, molecular electronic memory device, or insulator resistance change memory.

Figure 2A:
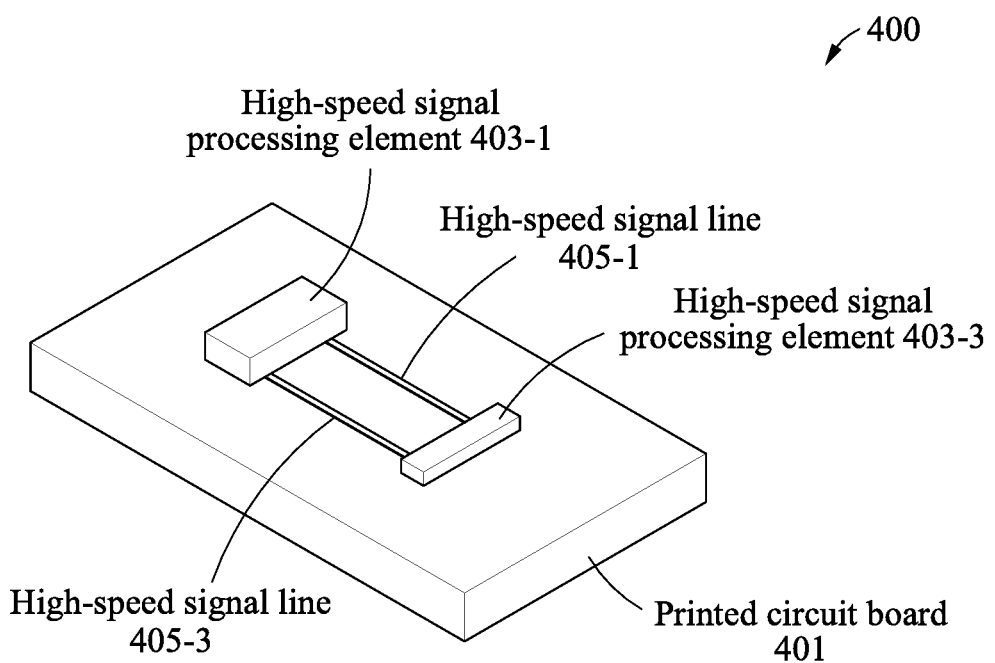
FIG. 2A is a perspective view illustrating an optical transceiver according to a related art.
Figure 2B:
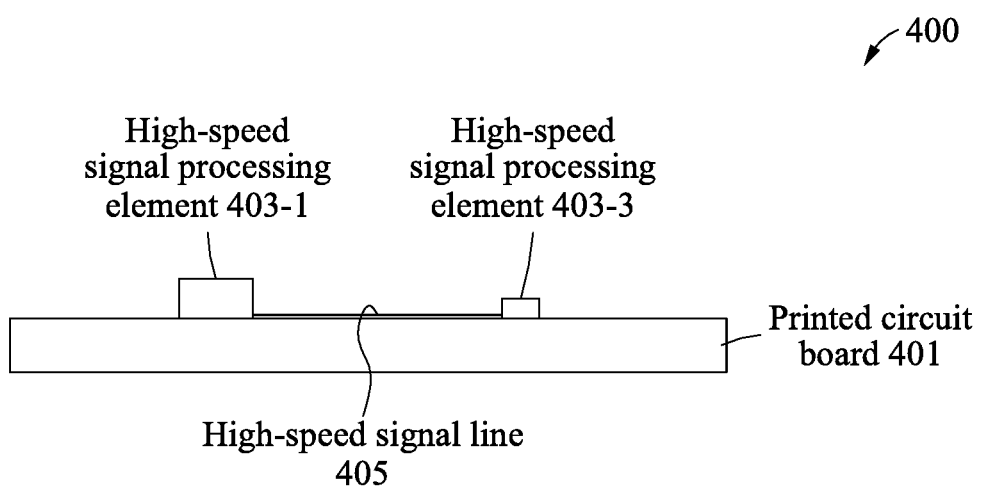
FIG. 2B is a side view illustrating an optical transceiver according to a related art.

FIG. 2A is a perspective view illustrating an optical transceiver according to a related art and FIG. 2B is a side view illustrating an optical transceiver according to a related art.

In an optical communication system, an optical transceiver 400 may include a signal line, for example, a high-speed signal line). FIGS. 2A and 2B illustrate the optical transceiver 400 according to a related art. The optical transceiver 400 may include a printed circuit board 401, high-speed signal processing elements 403-1 and 403-3, and high-speed signal lines 405-1 and 405-3.

As illustrated in FIGS. 2A and 2B, the optical transceiver 400 may include the high-speed signal processing elements 403-1 and 403-3 on the printed circuit board 401. The high-speed signal processing element 403-1 and the high-speed signal processing element 403-3 may be connected by the high-speed signal lines 405-1 and 405-3. In this instance, impedances of the high-speed signal lines 405-1 and 405-3 may be controlled.

The high-speed signal line 405 of FIG. 2B may represent a side surface of the high-speed signal line 405-1 or the high-speed signal line 405-3.

Figure 3A:
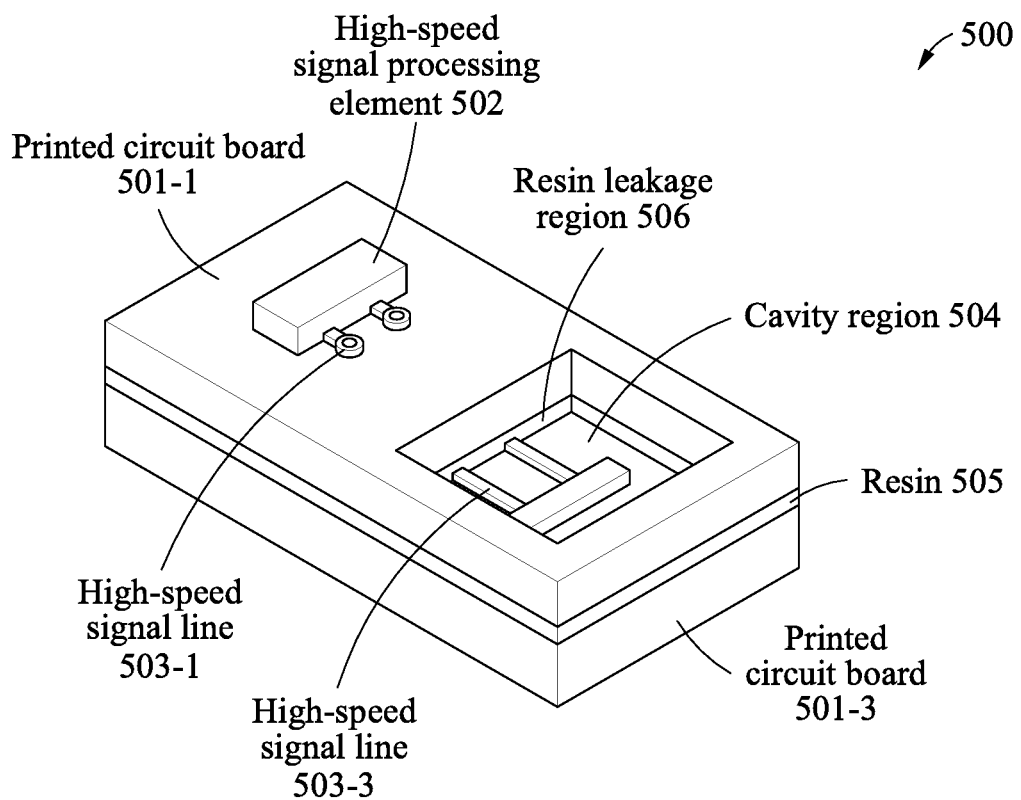
FIG. 3A is a perspective view illustrating an optical transceiver including a cavity region.
Figure 3B:
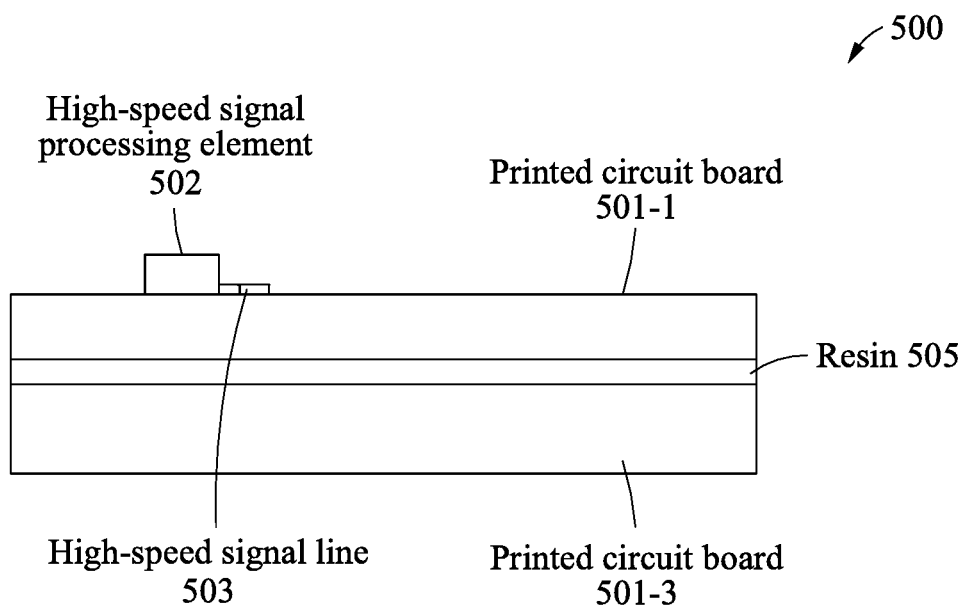
FIG. 3B is a side view illustrating an optical transceiver including a cavity region.

FIG. 3A is a perspective view illustrating an optical transceiver including a cavity region and FIG. 3B is a side view illustrating an optical transceiver including a cavity region.

A recent optical transceiver 500 may require minimization, high-density, and multi-channel configuration and thus, require a higher density when compared to the typical optical transceiver 400. Accordingly, to solve a space constraint problem, the recent optical transceiver 500 may increase the density based on configurations as shown in FIGS. 3A and 3B.

The optical transceiver 500 with the increased density may include printed circuit boards 501-1 and 501-3, a high-speed signal processing element 502, high-speed signal lines 503-1 and 503-3, resin 505, and a cavity region 504.

To implement a high-density configuration, the optical transceiver 500 may include the cavity region 504. An impedance of the high-speed signal line 503 may be controlled. The resin 505 may be applied between the printed circuit board 501-1 and the printed circuit board 501-3.

Although the optical transceiver 500 may achieve a high-density characteristic through the cavity region 504, a leakage of the resin 505 into a resin leakage region 506 may occur in the cavity region 504.

Impedance mismatching may occur at a point at which a resin leakage is present in the high-speed signal line 503-3. Since it is difficult to control a leakage resin distribution region, impedance correction to overcome such may be required.

Figure 4A:
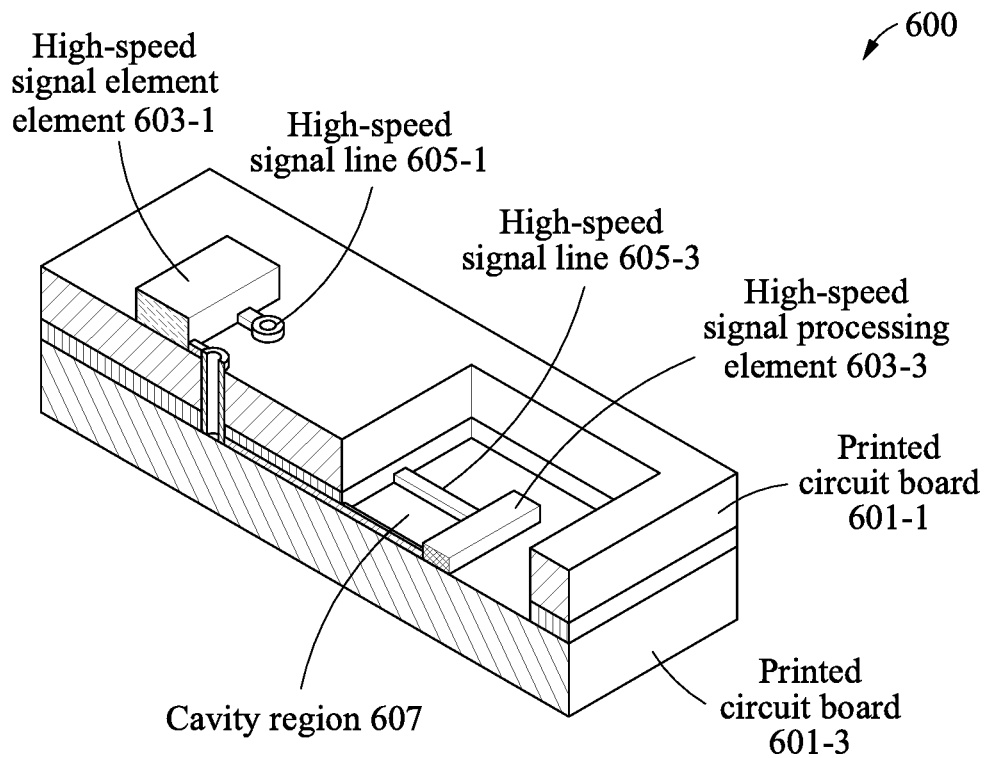
FIG. 4A is a perspective cross-sectional view illustrating an optical transceiver including a cavity region.
Figure 4B:
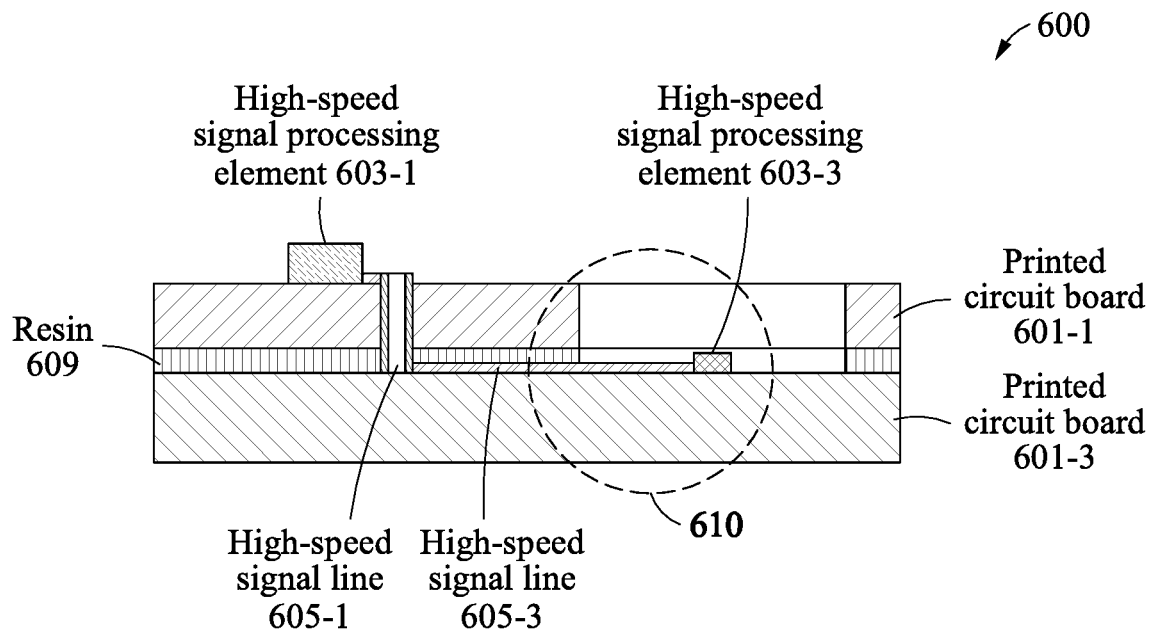
FIG. 4B is a cross-sectional view illustrating a case in which a resin leakage is absent in a cavity region of the optical transceiver of FIG. 4A.

FIG. 4A is a perspective cross-sectional view illustrating an optical transceiver including a cavity region and FIG. 4B is a cross-sectional view illustrating a case in which a resin leakage is absent in a cavity region of the optical transceiver of FIG. 4A.

Figure 4C:
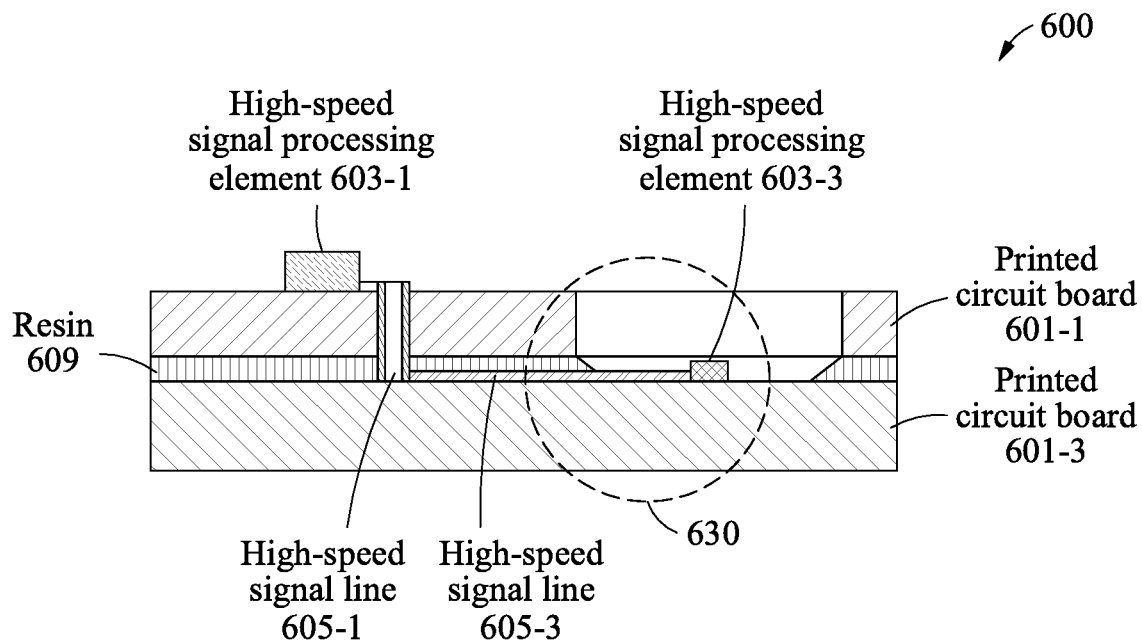
FIG. 4C is a cross-sectional view illustrating a case in which a resin leakage is minimum in a cavity region of the optical transceiver of FIG. 4A.
Figure 4D:
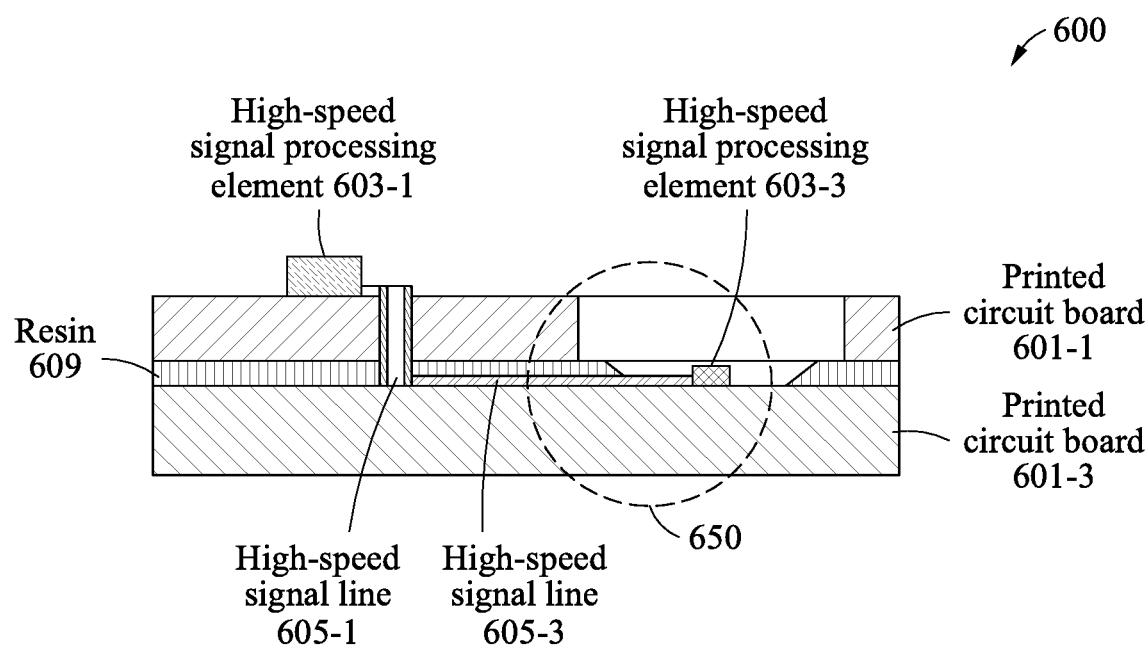
FIG. 4D is a cross-sectional view illustrating a case in which a resin leakage is maximum in a cavity region of the optical transceiver of FIG. 4A.

FIG. 4C is a cross-sectional view illustrating a case in which a resin leakage is minimum in a cavity region of the optical transceiver of FIG. 4A and FIG. 4D is a cross-sectional view illustrating a case in which a resin leakage is maximum in a cavity region of the optical transceiver of FIG. 4A.

Referring to FIGS. 4A through 4D, an optical transceiver 600 may include printed circuit boards 601-1 and 601-3, high-speed signal processing elements 603-1 and 603-3, high-speed signal lines 605-1 and 605-3, and a cavity region 607.

The high-speed signal line 605-1 and the high-speed signal line 605-3 may be connected under the printed circuit board 601-1 to connect the high-speed signal processing element 603-1 and the high-speed signal processing element 603-3.

As described above, resin 609 may leak in the cavity region 607. FIGS. 4B through 4D respectively illustrate a case in which a leakage of the resin 609 is absent on the high-speed signal line 605-3 of the cavity region 607, a case in which the leakage of the resin 609 is minimum, and a case in which the leakage of the resin 609 is maximum.

A signal line region 610 may represent an ideal case in which the leakage of the resin 609 is absent. The example of FIG. 4B may be a state in which the resin 609 does not leak into the cavity region 607 in the signal line region 610.

FIGS. 4C and 4D illustrate a state in which the leakage of the resin 609 occurs due to a process error generated in a process of applying the resin 609.

A signal line region 630 of FIG. 4C may represent a state in which the leakage of the resin 609 is minimum. The signal line region 630 of FIG. 4C may represent a state in which the resin 609 leaks into the cavity region 607.

A signal line region 650 of FIG. 4D may represent a state in which a larger amount of the resin 609 leaks into the cavity region 607 when compared to the case of FIG. 4C.

A start point of the leakage of the resin 609 may indicate a point at which the high-speed signal line 605-3 starts to be exposed to the cavity region 607. A peak point may indicate a point at which the leakage of the resin 609 ends when the leakage of the resin 609 is maximum.

Hereinafter, an impedance of a signal line in the cases of FIGS. 4B through 4D will be described with reference to FIGS. 5A through 5C.

Figure 5A:
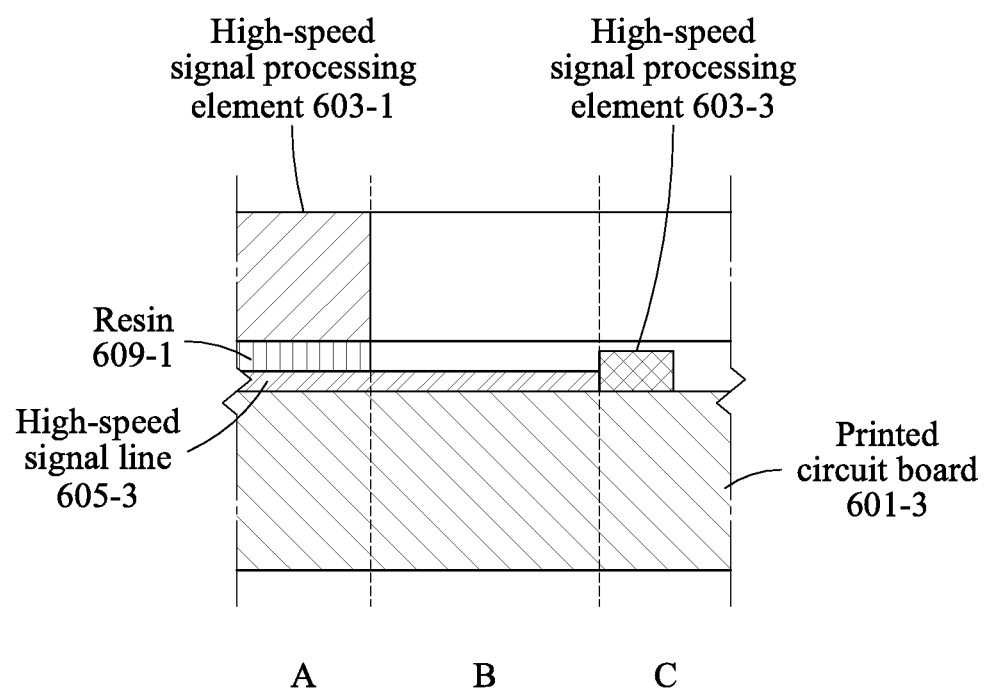
FIG. 5A illustrates an example of an impedance of a signal line of FIG. 4B.
Figure 5A:
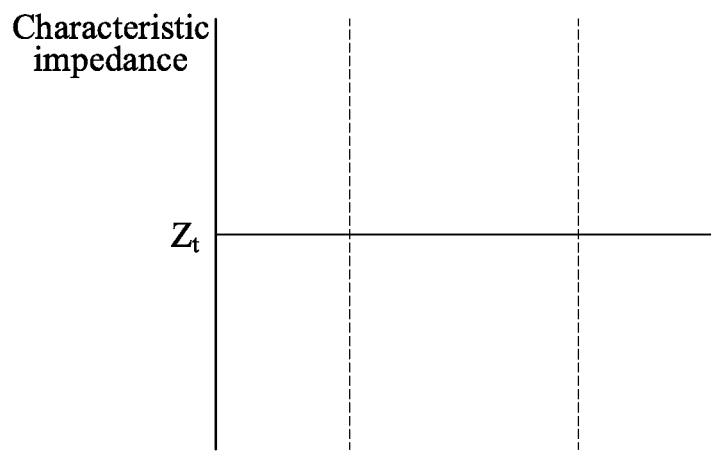
Figure 5B:
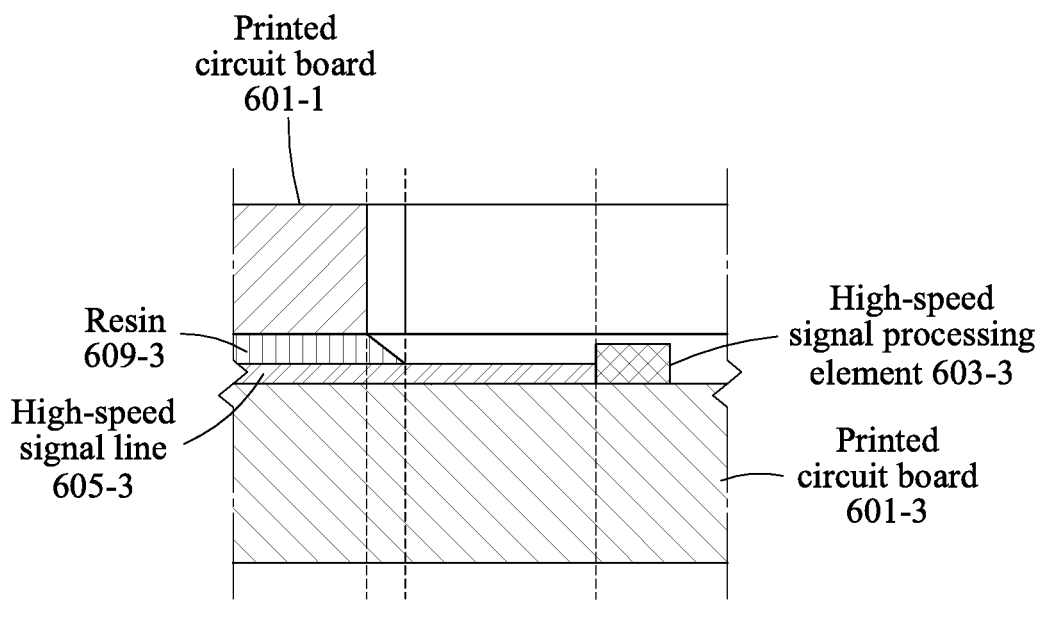
FIG. 5B illustrates an example of an impedance of a signal line of FIG. 4C.
Figure 5B:
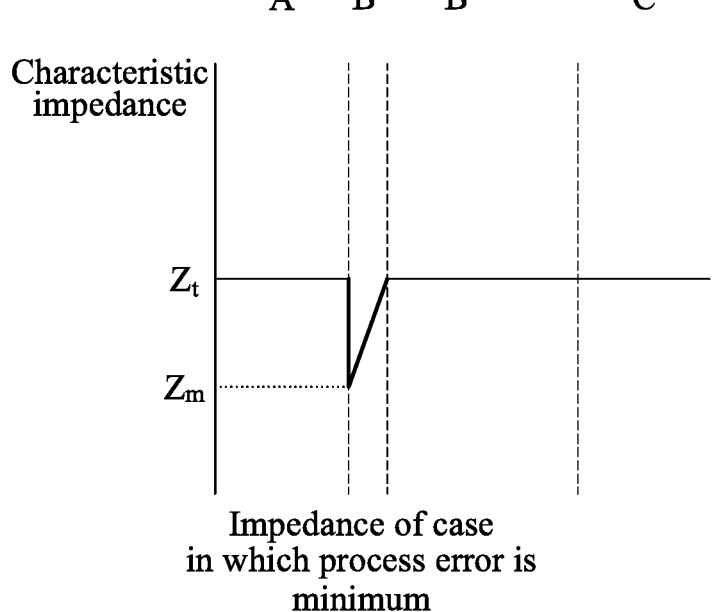
Figure 5C:
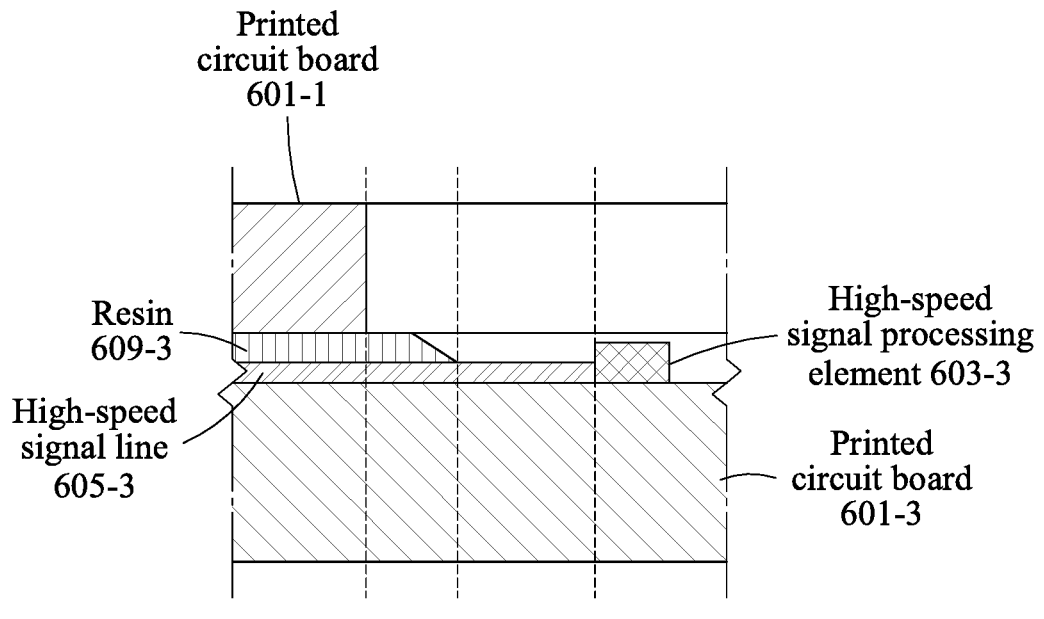
FIG. 5C illustrates an example of an impedance of a signal line of FIG. 4D.
Figure 5C:
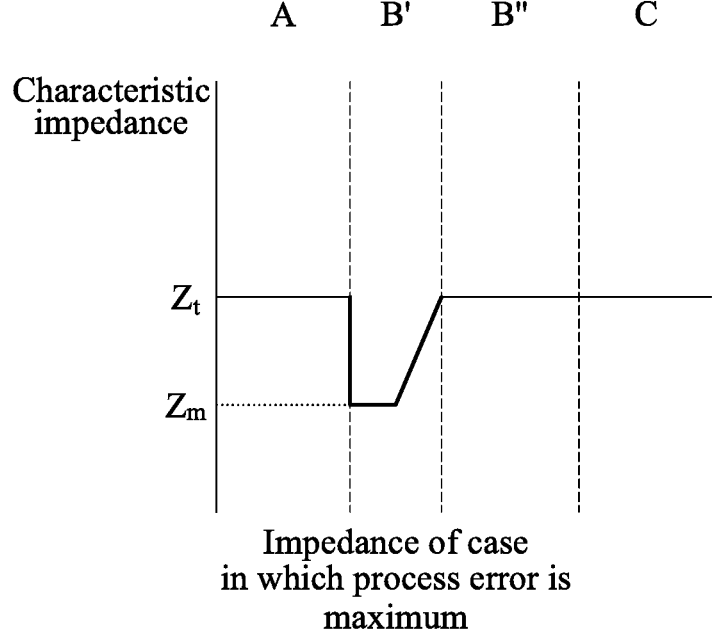

FIG. 5A illustrates an example of an impedance of the signal line of FIG. 4B, FIG. 5B illustrates an example of an impedance of the signal line of FIG. 4C, and FIG. 5C illustrates an example of an impedance of the signal line of FIG. 4D.

FIGS. 5A through 5C illustrate a characteristic impedance of a signal line for each of signal line regions 610, 630 and 650. As illustrated in FIG. 5A, when a leakage of the resin 609 is absent in the cavity region 607, impedance mismatching may not occur. When the impedance mismatching does not occur, the high-speed signal line 605-3 may have an impedance matched to a target impedance value $Z_t$.

FIGS. 5B and 5C illustrate an impedance measured in a case in which a leakage of the resin 609 occurs in the cavity region 607. When the leakage of the resin 609 occurs on the high-speed signal line 605-3, impedance mismatching may occur.

As illustrated in FIG. 5A, when the impedance mismatching does not occur, the impedance of the high-speed signal line 605-3 may maintain the target impedance value (e.g., $Z_t$).

As illustrated in FIG. 5B, when the leakage of the resin 609 occurs, the impedance mismatching may occur in an area in which the resin 609 leaks, for example, a region B'. For example, an impedance value (e.g., $Z_m$) may be less than the target impedance value at a point at which the leakage the resin 609 starts.

The point at which the leakage of the resin 609 starts may indicate a point at which the region B' of FIG. 5B starts. The impedance may be significantly reduced and increased in the region B' and then restored to be the target impedance value $Z_t$ at a point at which the region B' ends.

As illustrated in FIG. 5C, when the leakage of the resin 609 is larger than the case of FIG. 5B, an impedance reduction phenomenon caused by the resin 609 may maintain a predetermined value (e.g., $Z_m$), and then increase to be restored to the target impedance value.

Since a thickness of the resin 609 decreases at a point at which the leakage ends, the impedance may increase at which the point at the leakage ends.

In the cases of FIGS. 5B and 5C, from the point at which the leakage of resin ends, the high-speed signal line 605-3 may be matched to the target impedance $Z_t$.

Hereinafter, an operation of the impedance correcting apparatus 10 correcting the impedance mismatching due to the leakage of the resin 609 will be described in detail with reference to FIGS. 6A through 9B.

Figure 6A:
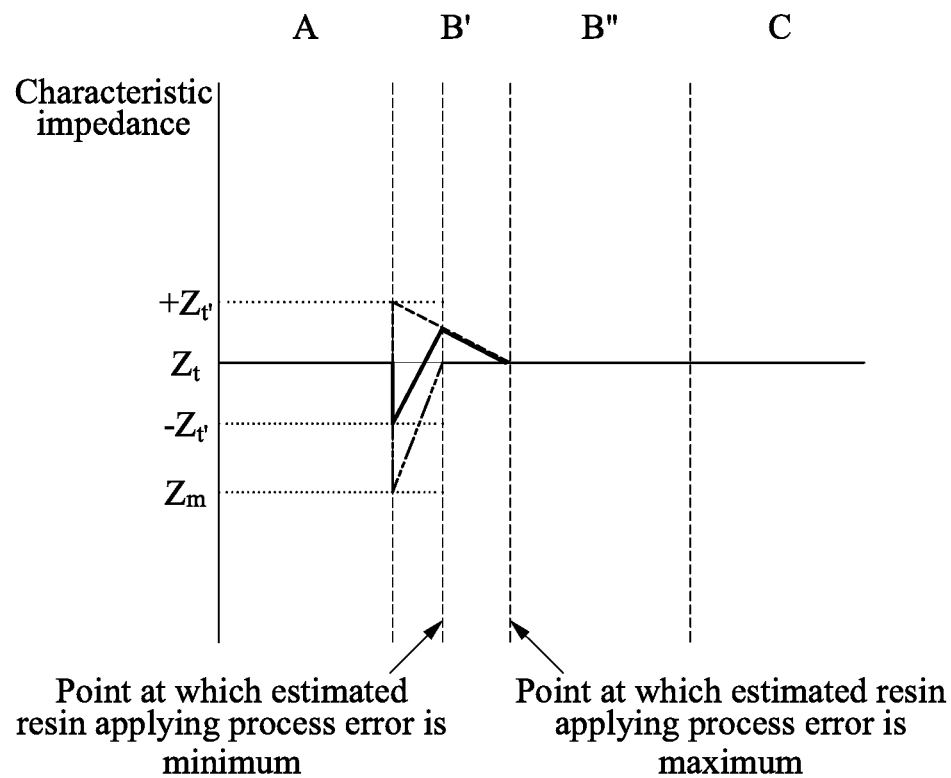
FIG. 6A illustrates an example of an impedance correction performed in a case in which a resin leakage is minimum.
Figure 6B:
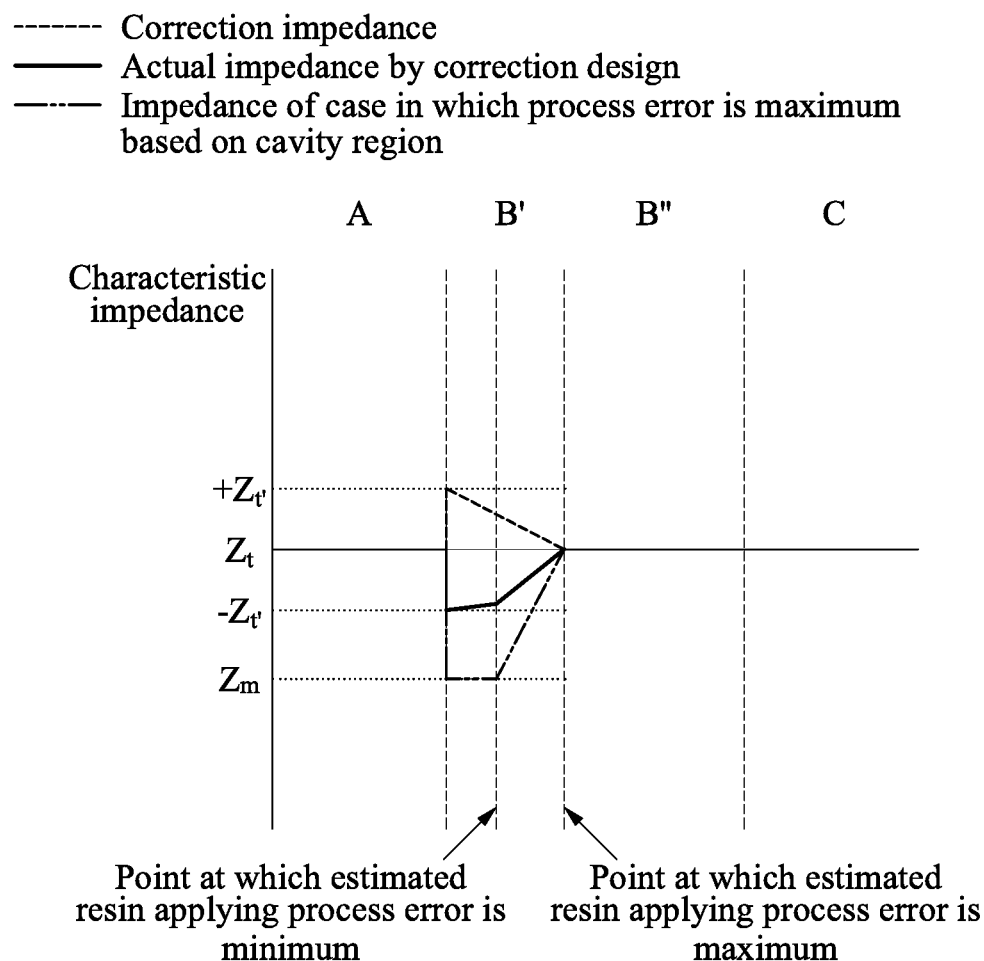
FIG. 6B illustrates an example of an impedance correction performed in a case in which a resin leakage is maximum.

FIG. 6A illustrates an example of an impedance correction performed in a case in which a resin leakage is minimum and FIG. 6B illustrates an example of an impedance correction performed in a case in which a resin leakage is maximum.

Referring to FIGS. 6A and 6B, the processor 200 may receive an impedance according to an error in a process of applying the resin 609 and acquire a correction parameter.

In a graph of FIG. 6A, an impedance according to an error may be an impedance of a case in which a process error is minimized. The processor 200 may acquire an error start point based on the impedance according to the error. In the case of FIG. 6A, the error start point may be a start point (or leftmost point) of a region B'.

The processor 200 may acquire a peak point of the error based on the impedance according to the error. In the cases of FIGS. 6A and 6B, the peak point of the error may be an end point (or rightmost point) of the region B'.

The processor 200 may acquire an impedance value corresponding to the start point based on the impedance according to the error. In the cases of FIGS. 6A and 6B, the impedance value corresponding to the start point may be $Z_m$.

The processor 200 may determine the correction impedance based on the start point, the peak point, the impedance value corresponding to the start point, and a target impedance value of a signal line. In FIGS. 6A and 6B, a target impedance value may be $Z_t$.

The processor 200 may determine the correction impedance such that the impedance is linearly reduced from the start point. The processor 200 may determine the correction impedance to have a maximum impedance at the start point and have the target impedance at the peak point.

The processor 200 may determine a peak value of the correction impedance based on a difference between the target impedance value and the impedance value corresponding to the start point. For example, the processor 200 may determine the peak value of the correction impedance based on Equation 1.

$$Z_{t'} = \left| \frac{Z_t - Z_m}{a} \right| \quad \text{[Equation 1]}$$

In Equation 1, $Z_{t'}$ denotes a difference between the peak value of the correction impedance and the target impedance, $Z_t$ denotes the target impedance value, and $Z_m$ denotes an impedance value of the start point of the error in the process of applying the resin 609. Also, a denotes a first correction constant.

The processor 200 may determine the peak value of the correction impedance by adjusting a value of the first correction constant a. a may include a positive real number. For example, a may be 2.

When a is 2, the peak value of the correction impedance may be a value obtained by adding, to the target impedance value, a value obtained by dividing the difference between the peak value of the correction impedance and the target impedance by 2.

Depending on an embodiment, the processor 200 may adjust the peak value of the correction impedance by adjusting the value of the first correction constant a. In the examples of FIGS. 6A and 6B, by using the above-described scheme, the processor 200 may determine the correction impedance as indicated by a solid line.

The processor 200 may determine an actual impedance (a solid line) by a correction design by correcting the impedance (a two-point chain line) due to the error by using the correction impedance (a broken line). For example, the processor 200 may offset the impedance according to the error using the correction impedance, thereby matching the impedance such that the high-speed signal line 605-3 has a more even impedance value.

By linearly determining the correction impedance as illustrated in FIGS. 6A and 6B, it is possible to correct the impedance mismatching in the case of FIG. 6A in which the leakage of the resin 609 is minimum and the case of FIG. 6B in which the leakage of the resin 609 is maximum both.

Figure 7A:
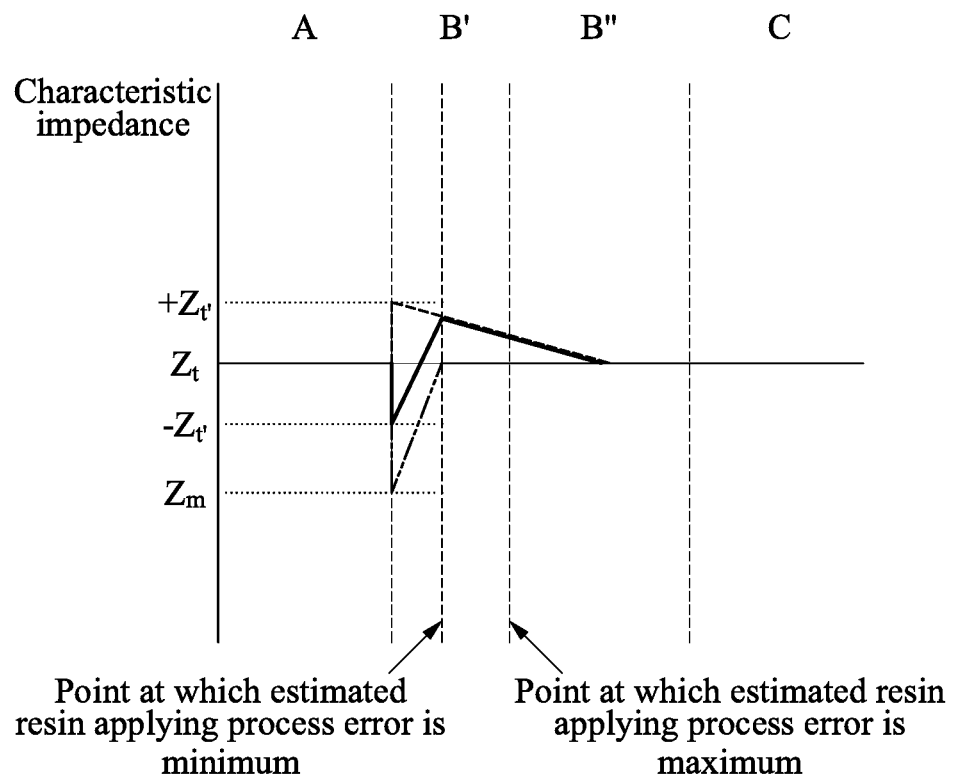
FIG. 7A illustrates another example of an impedance correction performed in a case in which a resin leakage is minimum.
Figure 7B:
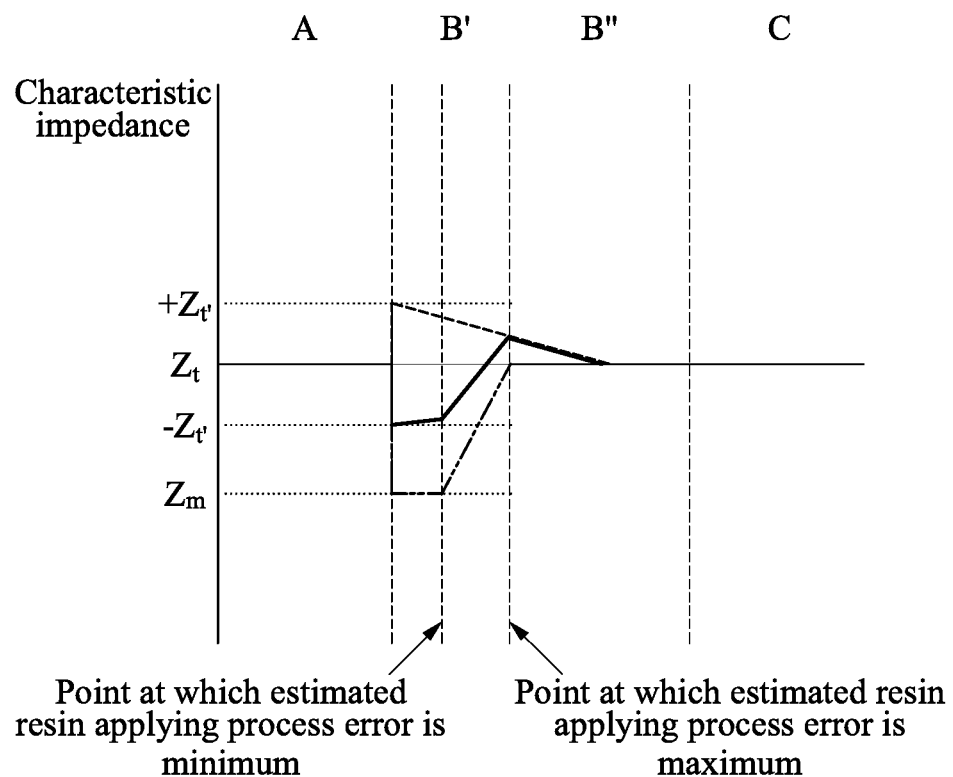
FIG. 7B illustrates another example of an impedance correction performed in a case in which a resin leakage is maximum.

FIG. 7A illustrates another example of an impedance correction performed in a case in which a resin leakage is minimum and FIG. 7B illustrates another example of an impedance correction performed in a case in which a resin leakage is maximum.

Referring to FIGS. 7A and 7B, an impedance due to a process error may be the same as FIGS. 6A and 6B. Thus, a process of acquiring a start point and a peak point of the error and an impedance value of the start point may be identical or similar to that of FIGS. 6A and 6B. Likewise, a target impedance may be $Z_t$, which is the same as FIGS. 6A and 6B.

The processor 200 may determine a correction impedance such that an impedance is linearly reduced from the start point. The processor 200 may determine the correction impedance to have a maximum impedance at the start point and have the target impedance at the peak point.

The processor 200 may determine a peak value of the correction impedance based on a difference between the target impedance value and the impedance value corresponding to the start point. For example, the processor 200 may determine the peak value of the correction impedance based on Equation 1 as shown above.

In this example, the processor 200 may determine the correction impedance such that a gradient at which the correction impedance decreases is more moderate in comparison to FIGS. 6A and 6B (for example, an absolute value of the gradient is less than that of FIGS. 6A and 6B).

To determine the correction impedance having the moderate gradient, the processor 200 may determine the correction impedance to have an impedance value greater than the target impedance value at the peak point.

In this case, the processor 200 may determine the correction impedance to have the target impedance value at a point (for example, a further right point) farther than a peak point of the leakage of the resin 609.

The processor 200 may determine an actual impedance (a solid line) by a correction design by correcting the impedance (a two-point chain line) due to the error by using the correction impedance (a broken line). For example, the processor 200 may offset the impedance according to the error using the correction impedance, thereby matching the impedance such that the high-speed signal line 605-3 has a more even impedance value.

By linearly determining the correction impedance as illustrated in FIGS. 7A and 7B, it is possible to correct the impedance mismatching in the case of FIG. 7A in which the leakage of the resin 609 is minimum and the case of FIG. 7B in which the leakage of the resin 609 is maximum both.

Figure 8A:
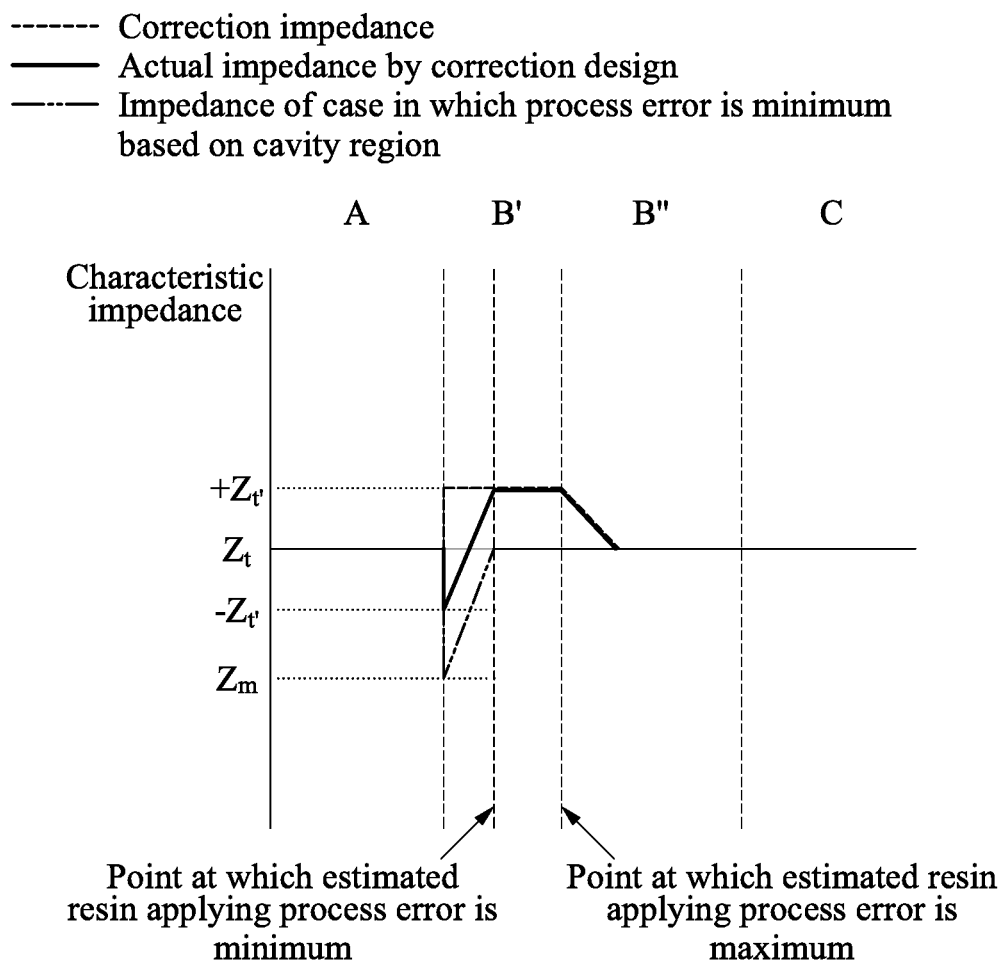
FIG. 8A illustrates still another example of an impedance correction performed in a case in which a resin leakage is minimum.
Figure 8B:
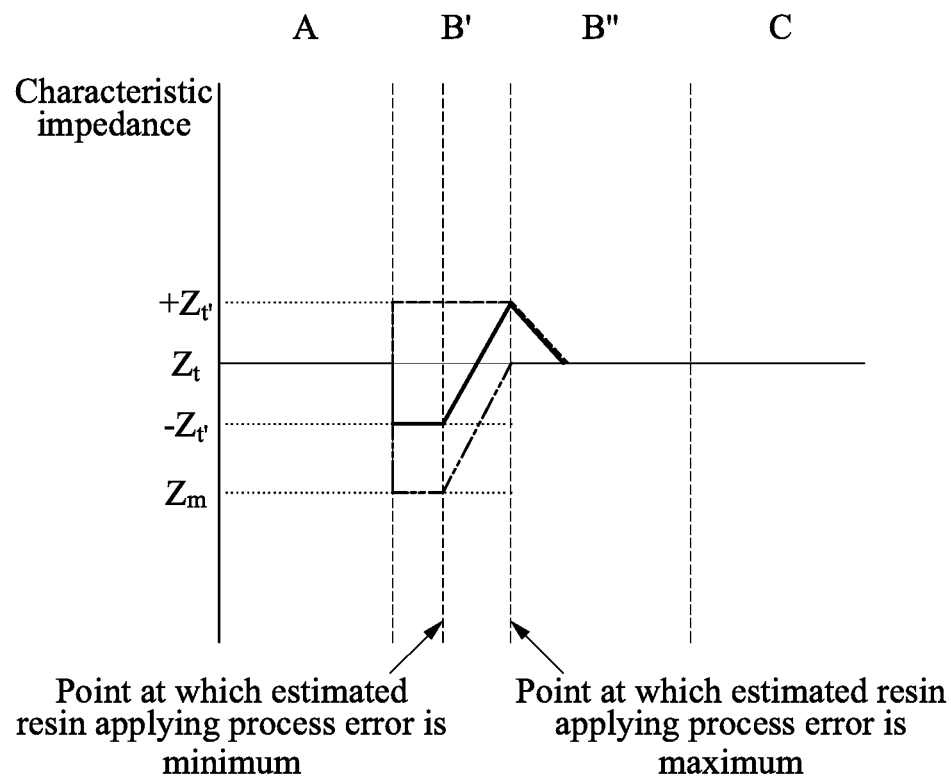
FIG. 8B illustrates still another example of an impedance correction performed in a case in which a resin leakage is maximum.

FIG. 8A illustrates still another example of an impedance correction performed in a case in which a resin leakage is minimum and FIG. 8B illustrates still another example of an impedance correction performed in a case in which a resin leakage is maximum.

Referring to FIGS. 8A and 8B, an impedance due to a process error may be the same as FIGS. 6A through 7B. Thus, a process of acquiring a start point and a peak point of the error and an impedance value of the start point may be identical or similar to that of FIGS. 6A through 7B. Likewise, a target impedance may be $Z_t$, which is the same as FIGS. 6A through 7B.

The processor 200 may determine a correction impedance to have a first impedance value from the start point to the peak point, linearly decrease from the peak point, and reach the target impedance value.

In the examples of FIGS. 8A and 8B, the processor 200 may determine the correction impedance to have the first impedance value in the region B' and determine the correction impedance to linearly decrease from a point at which the region B' ends (e.g., a leftmost point of the region B').

For example, the processor 200 may determine a first impedance to be $Z_t+Z_{t'}$. $Z_t$ denotes a target impedance, and $Z_{t'}$ may be determined based on Equation 1. That is, the first impedance may be the same as the peak value of the correction impedance described with reference to FIGS. 6A through 7B.

A gradient that the impedance decreases at the point at which the region B' ends may be adjusted depending on an embodiment. Unlike FIGS. 8A and 8B, the processor 200 may determine the correction impedance not to be linearly reduced.

By determining the correction impedance in a form of a trapezoid as illustrated in FIGS. 8A and 8B, it is possible to correct the impedance mismatching in the case of FIG. 8A in which the leakage of the resin 609 is minimum and the case of FIG. 8B in which the leakage of the resin 609 is maximum both.

Figure 9A:
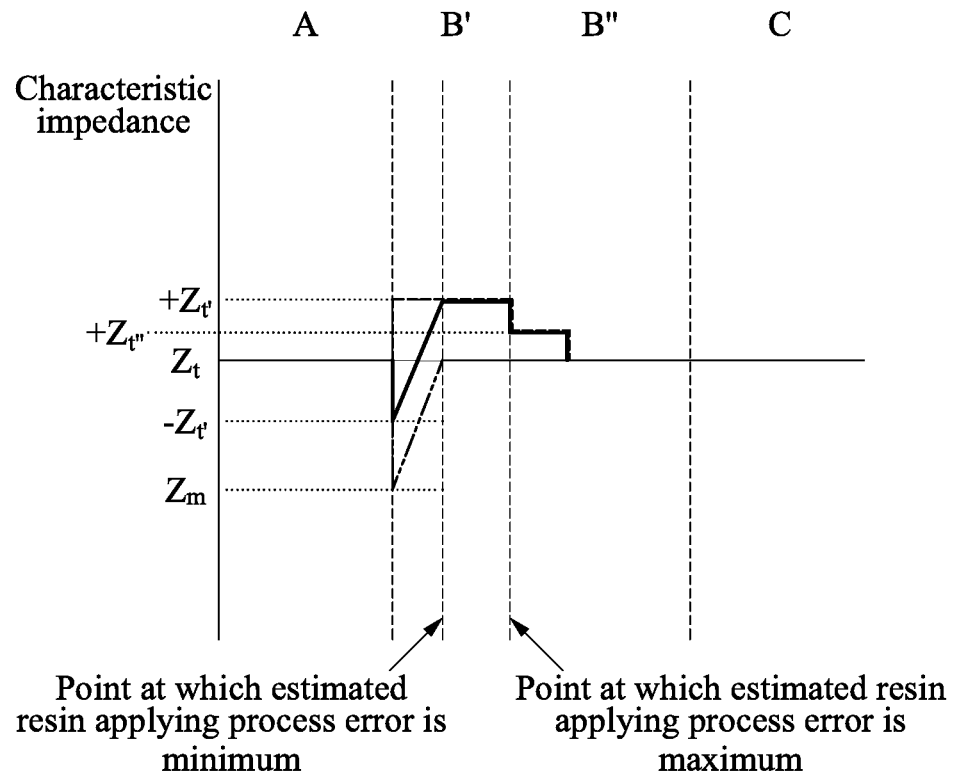
FIG. 9A illustrates yet another example of an impedance correction performed in a case in which a resin leakage is minimum.
Figure 9B:
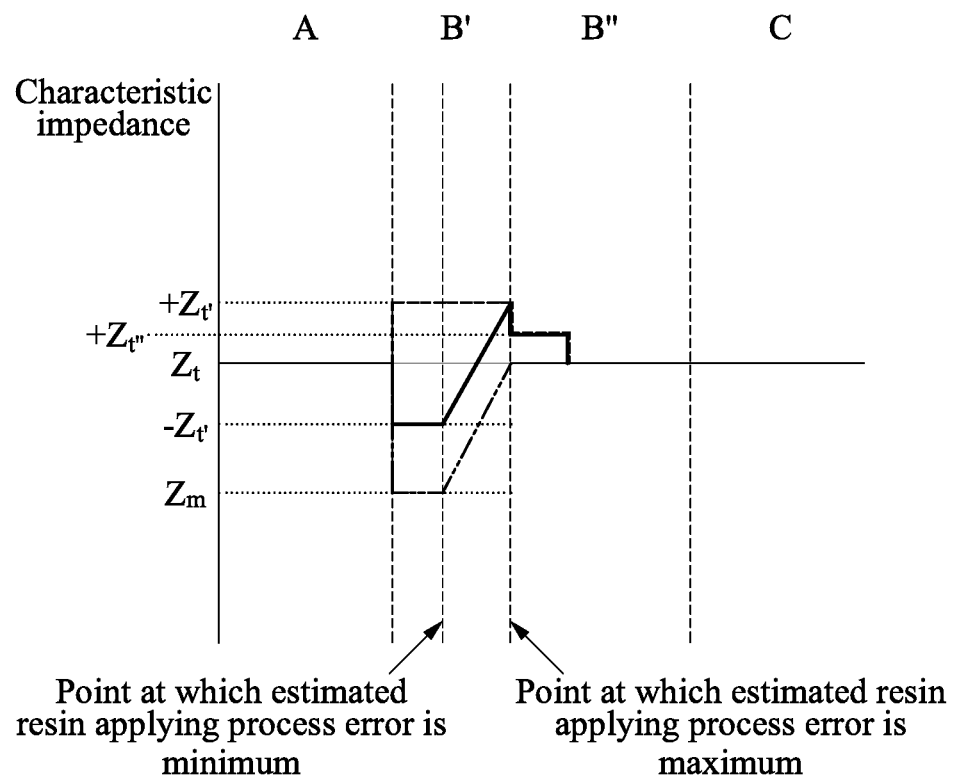
FIG. 9B illustrates yet another example of an impedance correction performed in a case in which a resin leakage is maximum.

FIG. 9A illustrates yet another example of an impedance correction performed in a case in which a resin leakage is minimum and FIG. 9B illustrates yet another example of an impedance correction performed in a case in which a resin leakage is maximum.

Referring to FIGS. 9A and 9B, an impedance due to a process error may be the same as FIGS. 6A through 8B. Thus, a process of acquiring a start point and a peak point of the error and an impedance value of the start point may be identical or similar to that of FIGS. 6A through 8B. Likewise, a target impedance may be $Z_t$, which is the same as FIGS. 6A through 8B.

The processor 200 may determine a correction impedance to have a first impedance value from the start point to the peak point and have a second impedance value by a predetermined length from the peak point.

The processor 200 may determine the correction impedance to have the first impedance value in the region B' and have the second impedance value in a portion of a region B". For example, the processor 200 may determine the first impedance to be $Z_t+Z_{t'}$.

$Z_t$ denotes a target impedance, and $Z_{t'}$ may be determined based on Equation 1. That is, the first impedance may be the same as the peak value of the correction impedance described with reference to FIGS. 6A through 7B.

The processor 200 may determine the second impedance based on the first impedance. In other words, the second impedance may be determined based on the first impedance.

For example, the processor 200 may determine the second impedance based on Equation 2.

$$Z_{t''} = \left|\frac{Z_{t'}}{b}\right| \quad \text{[Equation 2]}$$

In Equation 2, $Z_{t''}$ denotes a difference between the second impedance value and the target impedance, $Z_{t'}$ denotes a difference between the first impedance value and the target impedance, and b denotes a second correction constant.

The processor 200 may determine the second impedance value by adjusting a value of the second correction constant b. b may include a positive real number. For example, b may be 2.

When b is 2, the difference between the second impedance value and the target impedance may be ½ of the difference between the first impedance value and the target impedance.

Depending on an embodiment, the processor 200 may adjust the second impedance value by adjusting the second correction constant b. In the examples of FIGS. 9A and 9B, by using the above-described scheme, the processor 200 may determine the correction impedance as indicated by a solid line.

The processor 200 may determine an actual impedance (a solid line) by a correction design by correcting the impedance (a two-point chain line) due to the error by using the correction impedance (a broken line). For example, the processor 200 may offset the impedance according to the error using the correction impedance, thereby matching the impedance such that the high-speed signal line 605-3 has a more even impedance value.

By linearly determining the correction impedance as illustrated in FIGS. 9A and 9B, it is possible to correct the impedance mismatching in the case of FIG. 9A in which the leakage of the resin 609 is minimum and the case of FIG. 9B in which the leakage of the resin 609 is maximum both.

Figure 10:
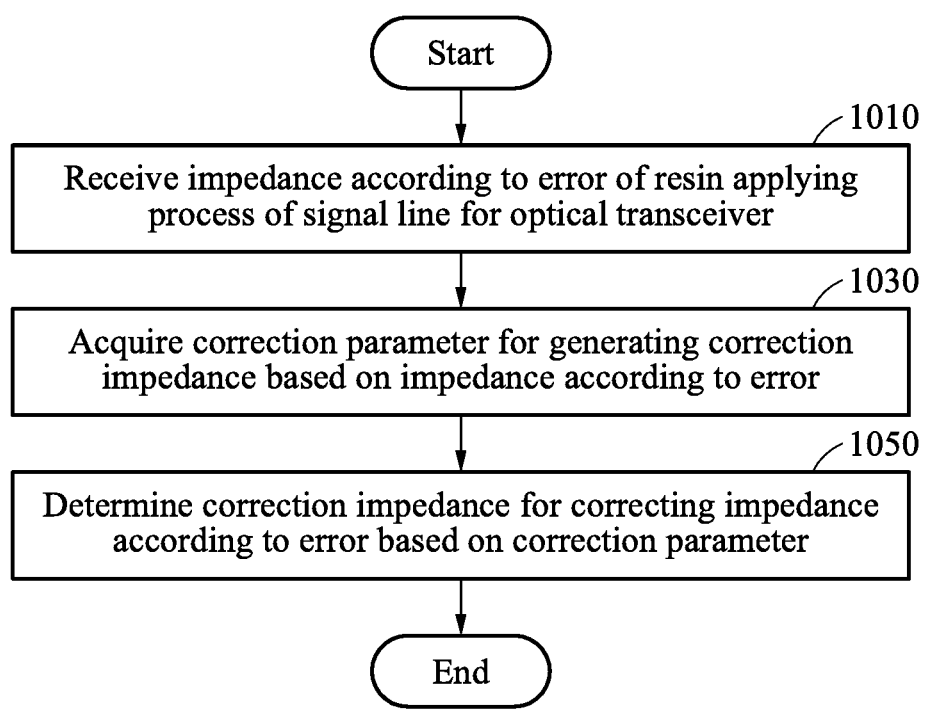
FIG. 10 illustrates an order of operations of the impedance correcting apparatus of FIG. 1.

FIG. 10 illustrates an order of operations of the impedance correcting apparatus of FIG. 1.

Referring to FIG. 10, in operation 1010, the receiver 100 may receive an impedance according to an error of a resin applying process of a signal line for an optical transceiver.

In operation 1030, the processor 200 may acquire a correction parameter for generating a correction impedance based on the impedance according to the error of the resin applying process.

The processor 200 may acquire a start point of the error based on the impedance according to the error. The processor 200 may acquire a peak point of the error based on the impedance according to the error. The processor 200 may acquire an impedance value corresponding to the start point based on the impedance according to the error.

In operation 1050, the processor 200 may determine the correction impedance for correcting the impedance according to the error based on the acquired correction parameter. The processor 200 may determine the correction impedance based on a start point of the error, a peak point of the error, an impedance value corresponding to the start point, and a target impedance value of the signal line.

The processor 200 may determine the correction impedance such that the impedance linearly decreases from the start point. The processor 200 may determine a peak value of the correction impedance based on a difference between the target impedance value and the impedance value corresponding to the start point.

In an example embodiment, the processor 200 may determine a correction impedance to have the target impedance value at the peak point. In another example embodiment, the processor 200 may determine a correction impedance to have an impedance value greater than the target impedance value at the peak point.

In still another example embodiment, the processor 200 may determine a correction impedance to have a first impedance value from the start point to the peak point, linearly decrease from the peak point, and reach the target impedance value.

In yet another example embodiment, the processor 200 may determine the correction impedance to have a first impedance value from the start point to the peak point and have a second impedance value by a predetermined length from the peak point.

The second impedance value may be determined based on the first impedance value.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described hardware devices may be configured to act as one or more software modules in order to perform the operations of the above-described example embodiments, or vice versa.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. An impedance correcting method comprising:
receiving, via a receiver electrically connected to a processor and a memory, an impedance according to an error of a resin applying process of a signal line for an optical transceiver;
acquiring, via the processor and the memory, a correction parameter for generating a correction impedance based on the impedance according to the error; and
determining, via the processor, the correction impedance for correcting the impedance according to the error based on the correction parameter,
wherein the determining, via the processor, of the correction impedance includes determining the correction impedance based on a start point of the error, a peak point of the error, an impedance value corresponding to the start point, and a target impedance value of the signal line.

2. The impedance correcting method of claim 1, wherein the acquiring, via the processor and the memory, of the correction parameter comprises:
acquiring a start point of the error based on the impedance according to the error;
acquiring a peak point of the error based on the impedance according to the error; and
acquiring an impedance value corresponding to the start point based on the impedance according to the error.

3. The impedance correcting method of claim 1, wherein the determining, via the processor, of the correction impedance based on the start point of the error, the peak point of the error, the impedance value corresponding to the start point, and the target impedance value of the signal line comprises:
determining the correction impedance such that the impedance linearly decreases from the start point.

4. The impedance correcting method of claim 3, wherein the determining, via the processor, of the correction impedance such that the impedance linearly decreases from the start point comprises:
determining a peak value of the correction impedance based on a difference between the target impedance value and the impedance value corresponding to the start point.

5. The impedance correcting method of claim 3, wherein the determining, via the processor, of the correction impedance such that the impedance linearly decreases from the start point comprises:
determining the correction impedance to have the target impedance value at the peak point.

6. The impedance correcting method of claim 3, wherein the determining, via the processor, of the correction impedance such that the impedance linearly decreases from the start point comprises:
determining the correction impedance to have an impedance value greater than the target impedance value at the peak point.

7. The impedance correcting method of claim 1, wherein the determining, via the processor, of the correction impedance based on the start point of the error, the peak point of the error, the impedance value corresponding to the start point, and the target impedance value of the signal line comprises:
determining the correction impedance to have a first impedance value from the start point to the peak point, linearly decrease from the peak point, and reach the target impedance value.

8. The impedance correcting method of claim 1, wherein the determining, via the processor, of the correction impedance based on the start point of the error of the resin applying process, the peak point of the error of the resin applying process, the impedance value corresponding to the start point, and the target impedance value of the signal line comprises:
determining the correction impedance to have a first impedance value from the start point to the peak point and have a second impedance value by a predetermined length from the peak point.

9. An impedance correcting apparatus comprising:
a receiver, electrically connected to a memory, where the receiver is configured to receive an impedance corresponding to an error of a resin applying process of a signal line for an optical transceiver; and
a processor, electrically connected to the memory and the receiver, where the processor is configured to acquire a correction parameter for generating a correction impedance based on the impedance according to the error and determine the correction impedance for correcting the impedance according to the error based on the correction parameter,
wherein the processor is configured to determine the correction impedance based on a start point of the error, a peak point of the error, an impedance value corresponding to the start point, and a target impedance value of the signal line.

10. The impedance correcting apparatus of claim 9, wherein the processor is configured to:
acquire a start point of the error based on the impedance according to the error;
acquire a peak point of the error based on the impedance according to the error; and
acquire an impedance value corresponding to the start point based on the impedance according to the error.

11. The impedance correcting apparatus of claim 9, wherein the processor is configured to determine the correction impedance such that the impedance linearly decreases from the start point.

12. The impedance correcting apparatus of claim 11, wherein the processor is configured to determine a peak value of the correction impedance based on a difference between the target impedance value and the impedance value corresponding to the start point.

13. The impedance correcting apparatus of claim 11, wherein the processor is configured to determine the correction impedance to have the target impedance value at the peak point.

14. The impedance correcting apparatus of claim 11, wherein the processor is configured to determine the correction impedance to have an impedance value greater than the target impedance value at the peak point.

15. The impedance correcting apparatus of claim 9, wherein the processor is configured to determine the correction impedance to have a first impedance value from the start point to the peak point, linearly decrease from the peak point, and reach the target impedance value.

16. The impedance correcting apparatus of claim 9, wherein the processor is configured to determine the correction impedance to have a first impedance value from the start point to the peak point and have a second impedance value by a predetermined length from the peak point.

17. The impedance correcting apparatus of claim 16, wherein the second impedance value is determined based on the first impedance value.

* * * * *